(No Model.)

F. MILLER.
SPRING FRAME FOR BICYCLES.

No. 460,179. Patented Sept. 29, 1891.

WITNESSES
C. M. Newman,
Arley I. Munson

INVENTOR
Frank Miller
By H. M. Wooster
Atty.

UNITED STATES PATENT OFFICE.

FRANK MILLER, OF STAMFORD, CONNECTICUT.

SPRING-FRAME FOR BICYCLES.

SPECIFICATION forming part of Letters Patent No. 460,179, dated September 29, 1891.

Application filed December 1, 1890. Serial No. 373,169. (No model.)

*To all whom it may concern:*

Be it known that I, FRANK MILLER, a citizen of the United States, residing at Stamford, in the county of Fairfield and State of Connecticut, have invented certain new and useful Improvements in Spring-Frames for Bicycles; and I do hereby declare the following to be a full, clear, and exact description of the invention, such as will enable others skilled in the art to which it appertains to make and use the same.

My invention has for its object to provide a simple, inexpensive, and durable spring-frame for bicycles, which, furthermore, shall be so constructed that if the springs give way entirely the usefulness of the wheel shall not be impaired in the slightest, the only difference being that the frame will be rigid instead of yielding.

With these ends in view I have devised the simple and novel construction of which the following description, in connection with the accompanying drawings, is a specification, numerals being used to denote the several parts.

Figure 1:
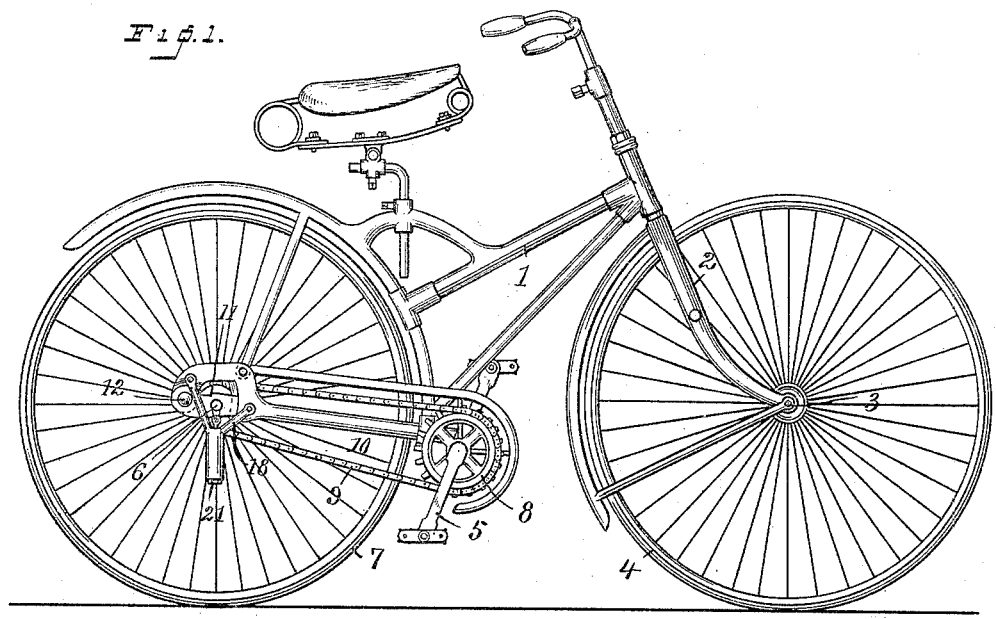
Figures 2, 3, 4:
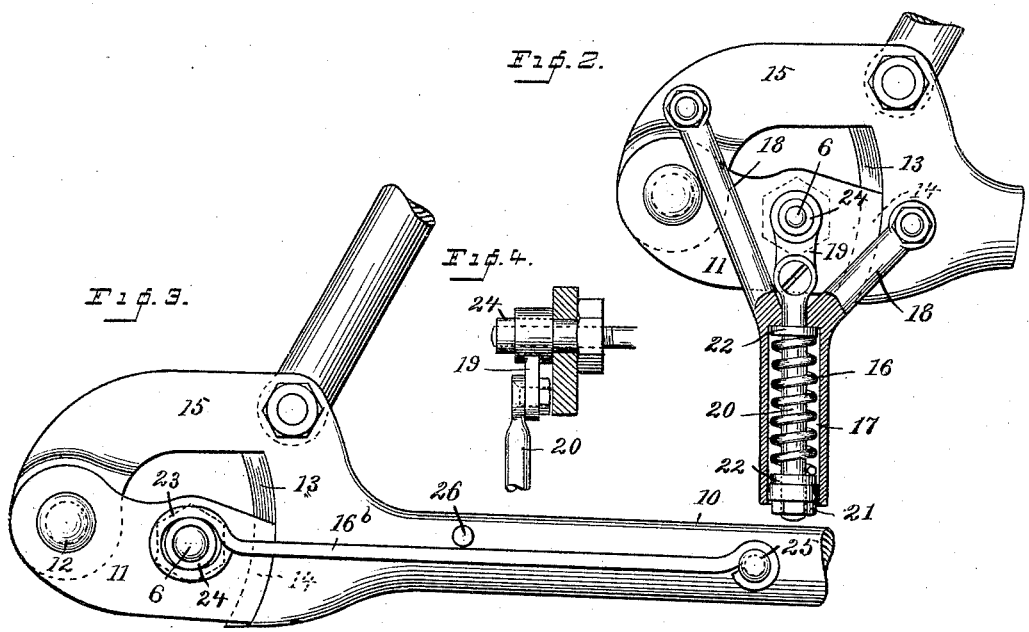

Figure 1 is a side elevation of a bicycle embodying my novel improvements; Fig. 2, an enlarged detail view, partly in section, illustrating one mode in which I have carried my invention into effect; Fig. 3, a similar view illustrating another mode in which I have carried my invention into effect; and Fig. 4 is a detail sectional view corresponding with Fig. 2.

1 denotes the frame of a bicycle; 2, the fork; 3, the front axle; 4, the front wheel; 5, the pedals; 6, the rear axle; 7, the rear wheel; 8, the sprockets; and 9, the chain. These parts may all be of the ordinary or any preferred construction, my invention being adapted to Safety bicycles as a class irrespective of their special details of construction.

The novel features of my invention lie in the special manner in which the rear axle is mounted. The side bars (denoted by 10) are arched, as at 15, in such a manner as to partially encircle the rear axle, but leaving considerable space between the axle and the side bars. This axle is mounted in carriers 11, the ends of which are pivoted to the side bars, as at 12.

13 denotes curved V-shaped bearings on the forward portions of the arches of the side bars, these bearings being arcs of circles of which pivot 12 is the center. The forward ends of the carriers are provided with V-shaped grooves 14, (indicated by dotted lines only,) which are engaged by the V-shaped bearings on the side bars, so that the carriers are held firmly in position, but at the same time are free to oscillate in the vertical plane on the bearings. The normal position of the carriers and rear axle is as shown in the drawings—that is, the carriers lie at considerable distance below the arches 15 of the side bars, in which position they are held by springs 16.

I have not deemed it necessary to make additional views simply to show that the mechanism is duplicated on both sides of the rear wheel. It should be understood, however, that the arched side bars, carriers, bearings, springs, &c., are the same on both sides of the wheel.

It will of course be apparent that the gist of my invention lies in mounting the rear axle in pivoted carriers supported by springs. The special form of springs used, however, and the necessary changes in the details of construction to permit the application of different forms of springs are not of the essence of my invention.

In Figs. 1, 2, and 4 I have shown the carriers as retained in their normal position by coil-springs inclosed in sockets 17, said sockets being provided with braces 18, by which they are rigidly bolted to the frame. At the outer ends of the axle are links 19, mounted, ordinarily, on sleeves 24. The opposite ends of said links are pivoted to rods 20, which extend down through the sockets and within the spiral springs. At the lower ends of the rods are nuts 21, the ends of the springs bearing against washers 22, placed between the springs and the nuts and between the springs and the tops of the sockets, the springs yielding by compression.

In the form shown in Fig. 3 the sockets, braces, links, rods, nuts, and washers are dispensed with and flat springs $16^b$ are substituted in lieu thereof. The rear ends of these springs are curved, as at 23, so as to encircle the sleeves 24 upon the axle. The forward ends of the springs are rigidly secured to the side bars, as at 25. Pins 26 over the springs act to retain them in operative position. It will be seen that in use when the rear wheel strikes an obstruction the carriers will swing on pivot 12 against the power of the springs, and that the blow, instead of being communicated directly to the frame of the machine, will be taken up by the springs. In the form shown in Figs. 1, 2, and 4 the tension of the springs may be readily adjusted by turning nuts 21 up or down, as may be required. Should either spring become broken in use, the other spring will ordinarily serve in place of both until a new spring can be obtained. Should both springs break, however, the efficiency of the machine for all practical purposes is not impaired in the slightest. In that event the frame, not being supported by the springs, will drop down until the arches of the side bars rest upon the carriers, thus making the frame rigid instead of yielding. With the exception, therefore, of the personal inconvenience to the rider caused by the rigidity of the frame, a bicycle embodying my novel improvement is equally practical with springs or without.

Having thus described my invention, I claim—

1. A spring-frame for bicycles, consisting of carriers in which the rear axle is mounted and which are provided with curved grooves 14 at their forward ends, side bars arched, as shown, to which the carriers are pivoted and which are provided with curved V-shaped bearings 13, engaging the grooves in the carriers, said bearings 13 and grooves 14 being arcs of circles of which the pivotal points of the carriers are the centers, and springs interposed between the carriers and the side bars, substantially as described.

2. The combination, with the rear axle, carriers in which it is mounted, and arched side bars to which the carriers are pivoted, of sockets 17, secured to the side bars, rods 20, coil-springs in said sockets surrounding the rods, nuts at the lower ends of said rods, against which the springs bear, and links connecting said rods with the axle, substantially as described.

3. The rear axle, sleeves 24 on the axle, carriers in which the sleeves are mounted, and arched side bars to which the carriers are pivoted and which are provided with bearings engaged by the carriers, in combination with sockets secured to the side bars, coil-springs in said sockets, rods extending through the sockets and having nuts against which the springs bear, and links mounted in the sleeves to which the upper ends of the rods are pivoted.

In testimony whereof I affix my signature in presence of two witnesses.

FRANK MILLER.

Witnesses:
A. M. WOOSTER,
ARLEY I. MUNSON.